(12) United States Patent
Rowe et al.

(10) Patent No.: US 11,266,121 B2
(45) Date of Patent: Mar. 8, 2022

(54) CANINE SELF EXERCISE DEVICE

(71) Applicant: Davante Amir Rowe, Charlotte, NC (US)

(72) Inventors: Davante Amir Rowe, Charlotte, NC (US); Robert Scott Post, Fountain City, IN (US)

(73) Assignee: Davante Amir Rowe, Indianapolis, IN (US)

( * ) Notice: Subject to any disclaimer, the term of this patent is extended or adjusted under 35 U.S.C. 154(b) by 122 days.

(21) Appl. No.: 16/916,566

(22) Filed: Jun. 30, 2020

(65) Prior Publication Data

US 2021/0400916 A1    Dec. 30, 2021

(51) Int. Cl.
*A01K 15/02* (2006.01)
*B65H 75/48* (2006.01)
*A63B 21/00* (2006.01)

(52) U.S. Cl.
CPC .......... *A01K 15/027* (2013.01); *A63B 21/153* (2013.01); *B65H 75/486* (2013.01)

(58) Field of Classification Search
CPC .... A01K 15/027; A63B 21/153; A63B 21/02; A63B 21/023; A63B 21/0435; A63B 21/045–0455; A63B 21/169; A63B 21/0053; A63B 21/157
See application file for complete search history.

(56) References Cited

U.S. PATENT DOCUMENTS

| | | | |
|---|---|---|---|
| 3,727,583 A | 4/1973 | Muraro | |
| 5,226,867 A | 7/1993 | Beal | |
| 5,938,565 A * | 8/1999 | Bernacki | A63B 21/153 482/5 |
| 7,631,617 B1 | 12/2009 | Tsengas | |
| 2002/0025891 A1 | 2/2002 | Colosky et al. | |
| 2011/0308477 A1* | 12/2011 | Durrani | A01K 15/025 119/709 |
| 2018/0103615 A1 | 4/2018 | Meade | |

OTHER PUBLICATIONS

International Searching Authority, Batres Arnal, Lucia Authorized Author, PCT International Search Report and Written Opinion of the International Searching Authority (PCT Rule 43bis.1), International Application No. PCT/US2021/031071, dated Aug. 26, 2021.

* cited by examiner

*Primary Examiner* — Timothy D Collins
*Assistant Examiner* — Maria E Graber
(74) *Attorney, Agent, or Firm* — Luedeka Neely Group, PC

(57) ABSTRACT

A self-exercise device that provides resistance to tugging, and is operable to intermittently change the resistance so as to mimic an actual tug-of-war game. The device includes ball gallery and ratchet structures that cooperate to provide additional intermittent resistance to provide action to the device that mimics an actual tug-of-war experience wherein the opposing resistance is randomly changing.

14 Claims, 8 Drawing Sheets

CANINE SELF EXERCISE DEVICE

FIELD

This disclosure relates to the field of pet exercise devices. More particularly, the disclosure relates to a tug-of-war simulation device that a pet such as a dog can use for self-exercise.

BACKGROUND

Improvement is desired in the construction of pet exercise devices, and in particular canine exercise devices for tug of war type exercise. In a conventional game of tug of war between a dog and a human using a tug-toy, the dog grasps one end of the toy with its teeth, while the human grasps the other end with a hand and pulls against the dog's pull. The pull applied by either is not constant, and in particular the human will randomly change the pull strength applied so that a back-forth tug of war game ensues.

The present disclosure fills a need in the art by providing an exercise device that can be used by a dog or other pet for self-exercise that provides advantages and features not found in prior devices.

The exercise device is advantageously configured to be wholly mechanical so as to be able to be used and left outdoors, and operable to intermittently change the resistance against which the dog pulls so as to mimic the desirable random change of pull strength as would be applied by a human.

SUMMARY

The above and other needs are met by an exercise device for simulating tug-of-war and provides resistance to tugging, and is operable to intermittently change the resistance so as to mimic an actual tug-of-war game In one aspect, an exercise device according to the disclosure includes a rotatable spool having a cord windable thereon in a first rotation direction and windable therefrom in a second rotation direction. The spool includes a ratchet flange having spaced apart projections. A torsion spring is operatively associated with the spool to urge the spool to rotate in the first rotation direction and to resist rotation of the spool in the second rotation direction. A shaft is operatively associated with the spool, wherein rotation of the shaft rotates the spool. The shaft includes a ball pocket thereon.

The exercise device also includes a ratchet having a shaft receiver configured for rotatably receiving the shaft, the shaft receiver including a ball gallery alignable with the ball pocket of the shaft and having a ball located therein. The ratchet further includes a ratchet wheel connected to the shaft receiver and having ratchet teeth, and a ratchet shaft connected to the ratchet wheel opposite the shaft receiver. The device includes a pawl having a lift surface configured to engage the projections of the ratchet flange of the spool and one or more engagement surfaces configured to engage the ratchet teeth of the ratchet. The device also has a rotatable knob having a cylindrical body. An elongate connector extends through the cylindrical body and connects the rotatable knob to the ratchet shaft of the ratchet. A one-way clutch is seated on the elongate connector in contact with the cylindrical body and a constant tension spring is wound onto the cylindrical body of the rotatable knob.

In another aspect, an exercise device according to the disclosure includes a frame and a rotatable spool mounted on the frame and having a cord windable thereon in a first rotation direction and windable therefrom in a second rotation direction. A torsion spring is connected to the frame and the spool and configured to urge the spool to rotate in the first rotation direction and to resist rotation of the spool in the second rotation direction. A shaft is operatively associated with the spool, with rotation of the shaft rotating the spool, the shaft including a ball pocket thereon. The device also includes a ratchet having a shaft receiver configured for rotatably receiving the shaft, the shaft receiver including a ball gallery alignable with the ball pocket of the shaft and having a ball located therein, the ratchet further including a ratchet wheel. A pawl is movably connected to the frame and located to selectively engage portions of the spool and portions of the ratchet wheel, and a constant tension spring is connected to the frame.

In a further aspect, an exercise device according to the disclosure includes a frame and a rotatable spool mounted on the frame and having a cord windable thereon in a first rotation direction and windable therefrom in a second rotation direction. A first spring is connected to the frame and the spool and configured to urge the spool to rotate in the first rotation direction and to resist rotation of the spool in the second rotation direction. A shaft is operatively associated with the spool, wherein rotation of the shaft rotates the spool, the shaft includes a ball pocket thereon.

The device also includes a ratchet having a shaft receiver configured for rotatably receiving the shaft, the shaft receiver including a ball gallery alignable with the ball pocket of the shaft and having a ball located therein, the ratchet further including a ratchet wheel. A pawl is movably connected to the frame and located to selectively engage portions of the spool and portions of the ratchet wheel. A second spring is also provided and connected to the frame.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
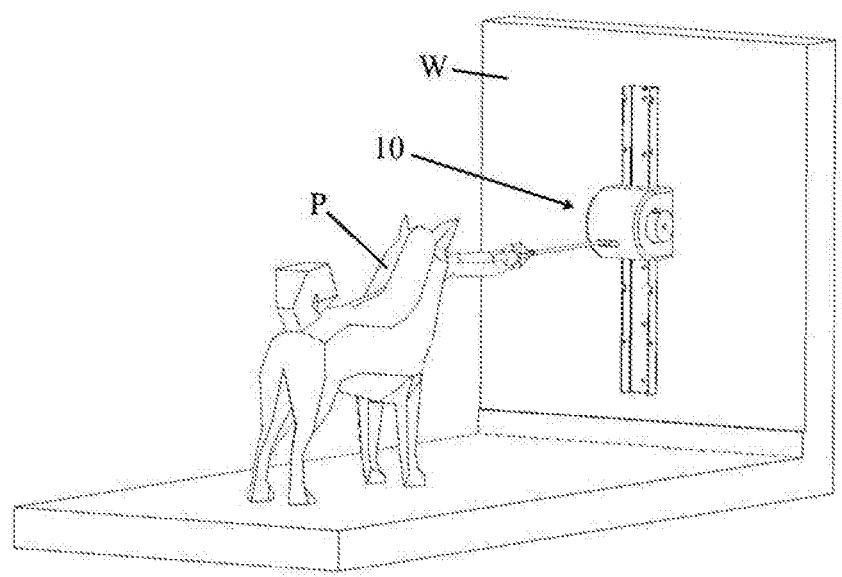
FIG. 1 shows an exercise device according to the disclosure installed onto a wall and in use by a pet to self-exercise.

With initial reference to FIG. 1, there is shown an exercise device 10 according to the disclosure mounted to a support surface such as a wall W and being used for exercise by a pet P such as a dog or other animal. The device 10 may also be configured to enable a human to use it for exercise.

It will be appreciated that the device 10 can be mounted to a variety of different support surfaces, such as posts, fences, trees and the like. In this regard, the device 10 is advantageously configured to be of wholly mechanical operation and made of rust-proof or rust-resistant materials so as to be able to be maintained outdoors if desired.

The device 10 is configured in one aspect to provide a constant pre-set resistance to the pet P during exercise. The device 10 is also advantageously configured to intermittently change the resistance against which the pet pulls so as to mimic the desirable random change of pull strength as would be applied by a human.

Figure 2:
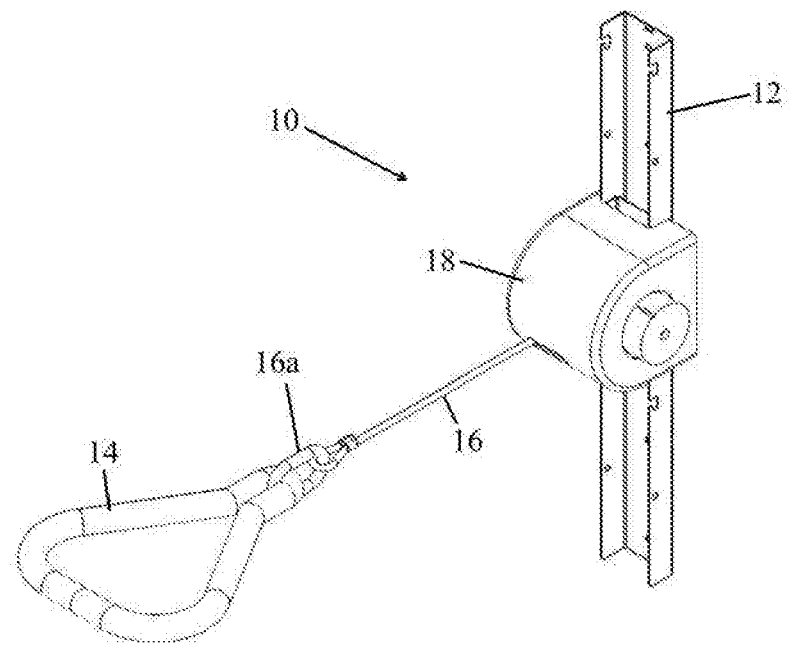
FIG. 2 is a close-up view of the exercise device.
Figure 3:
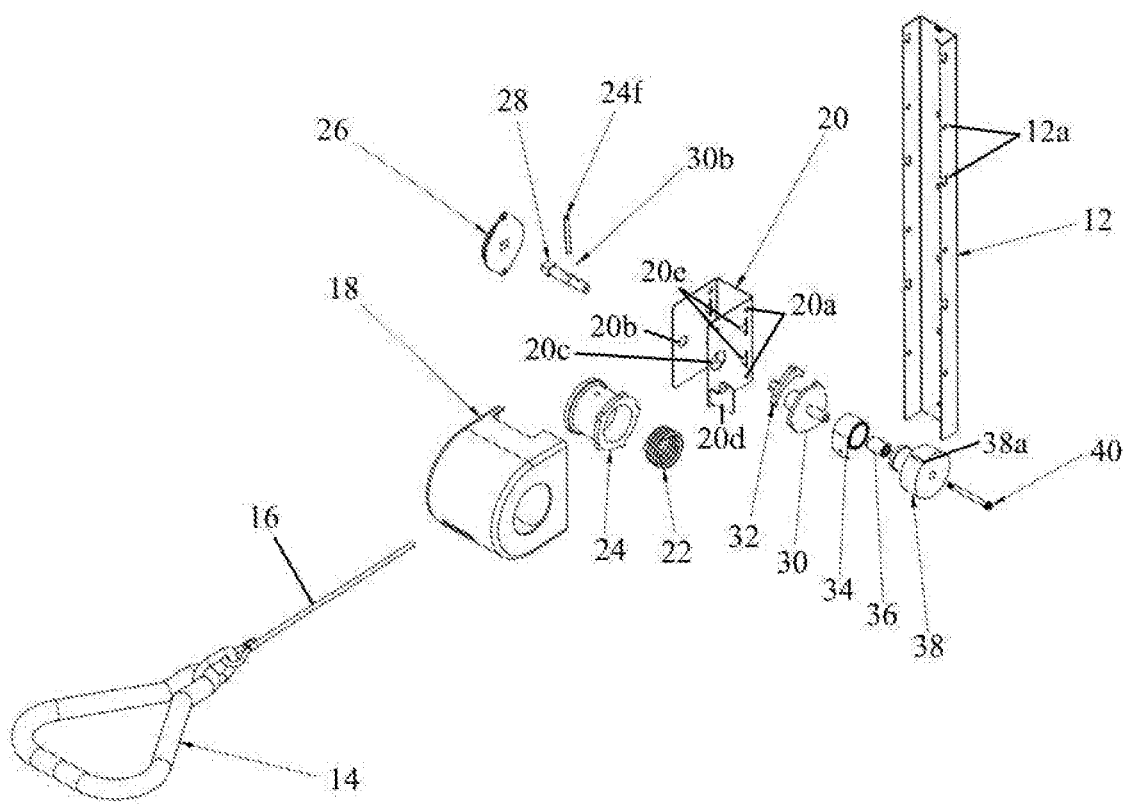
FIG. 3 is an exploded view of the exercise device.

With reference to FIGS. 2 and 3, the exercise device 10 includes as components a mounting rail 12, a pull toy 14 releasably mountable to an elongate cord 16, a cover 18, a chassis 20, a torsion spring 22, a spool 24, a rotary speed limiter 26, a shaft 28, a ratchet 30, a pawl 32, a constant tension spring 34, a one-way clutch 36, a rotatable knob 38 having a play indicator 38a, and a fastener 40.

Figure 4A:
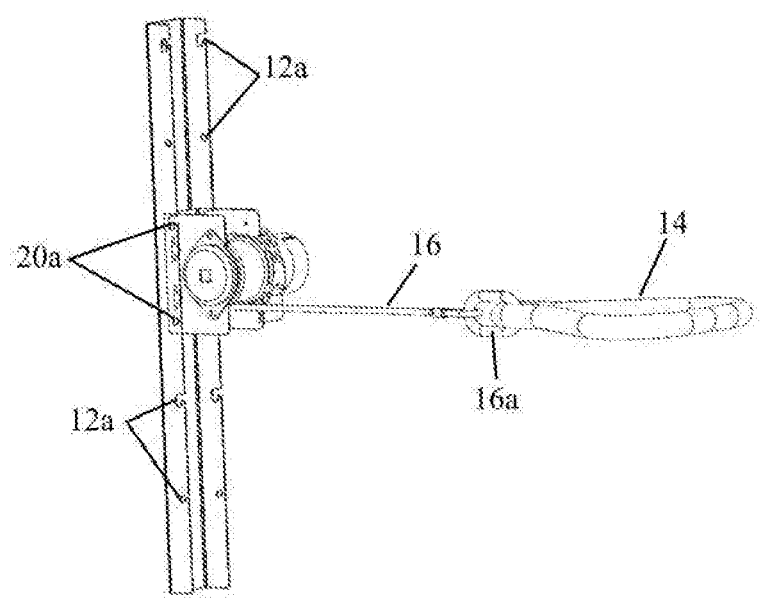
FIGS. 4A and 4B show the exercise device with a cover removed.
Figure 4B:
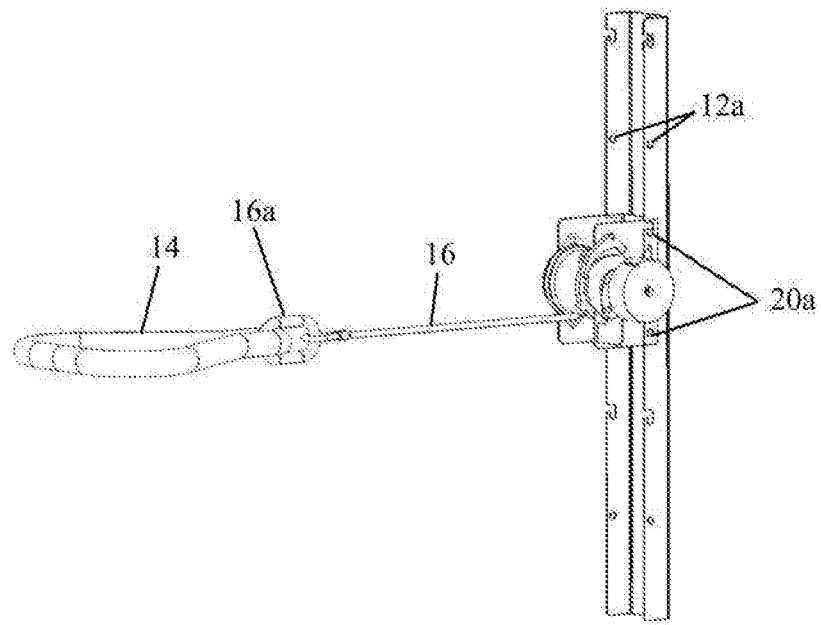

The mounting rail 12 is attachable to a support such as the wall W by fasteners such as screws or the like. The chassis 18 is adjustably positionable on the mounting rail 12 so that the height of the device 10 is adjustable to a height appropriate for the size of the pet P. As shown in FIGS. 4A and 4B, the mounting rail 12 has a plurality of spaced apart receivers 12a provided as by apertures, and the chassis 20 has corresponding receivers 20a.

To mount the device 10 at a desired height, the chassis 20 is positioned at a desired location on the mountain rail 12, and the receivers 12a and 20a are aligned and a fastener such as a pin or the like passed through the aligned receivers 12a and 20a to secure the chassis 20, and hence the device 10, to the mounting rail 12.

The pull toy 14 provides an exercise engagement device and may be of a variety of suitable pet toys configured for pets to grasp with their mouths, or otherwise for interaction. The cord 16 is suitably strong and of a soft, flexible wire, rope or like material so as to not cause harm to the pet should the pet accidently bite the cord. The cord 16 preferably includes on its distal end a releasable connector 16a to permit the toy 14 to be changed to a different toy or removed to stop the pet P from playing if desired.

The cover 18 is made of a durable all-weather material such as molded plastic and configured to have a desirable ornamental appearance and overlie and shield the internal components of the device 10 from the elements.

The chassis 20 is provided as a rigid u-shaped rigid member, preferably formed of aluminum. The chassis 20 provides a frame to support the internal components and to connect to the mounting rail 12 via the receivers 20a. The chassis 20 also includes aligned apertures 20b and 20c, and a tension spring mount 20d having a pin 20dd. As noted above, the device 10 can be mounted to a variety of different support surfaces, such as posts, fences, trees and the like. In this regard, the chassis 20 also includes receivers 20e configured for passage of a ratchet strap or the like for securing the chassis 20 to objects such as posts, trees and the like.

The torsion spring 22 is a conventional torsion spring in the form of a coil having opposite ends. The torsion spring 22 is configured to provide a desired pulling minimum pulling resistance and to be received within a spring receptacle 24a of the spool 24. One end of the torsion spring 22 connects to the chassis 20, as by insertion into an aperture, and the other end of the torsion spring 22 connects to an interior surface of the spring receptacle 24a of the barrel 24.

The spool 24 also includes a barrel 24b configured to have the cord 16 wound thereon, an arbor 24c, a smooth flange 24d, and a ratchet flange 24e having spaced apart projections 24ee. The spring receptacle 24a is an enlarged portion of the arbor 24b and having an open end adjacent the ratchet flange 24e. The spool 24 also includes a roll pin 24f that extends within a passage 24g between the barrel 24b and the arbor 24c. The roll pin 24f positively connects the spool 24 to the shaft 28 received within the arbor 24c.

The rotary speed limiter 26 controls the rotational speed of the shaft 28 in both directions and provides resistance as a function of speed. Various rotary speed limiting devices may be used such as torsional dampers and the like. The speed limiter 26 provides resistance as a function of speed such that more resistance is applied the faster the rotation of the shaft 28. A preferred speed limiter may be provided by rotary speed limiters available from McMaster-Carr of Santa Fe Springs, Calif. having a website url of www.mcmaster.com.

Figure 8:
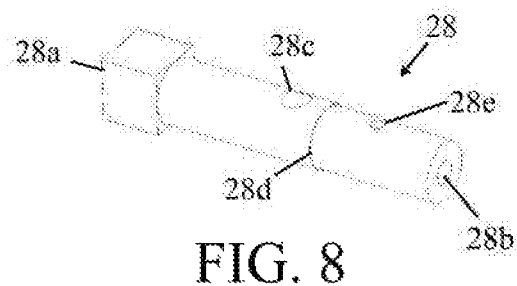
FIG. 8 is a perspective view of a shaft component of the device.

With additional reference to FIG. 8, the shaft 28 is preferably a metal shaft having a square head 28a at one end for engaging a corresponding receiver 26a of the speed limiter 26 and a threaded end 28b at the opposite end for threadably receiving the fastener 40. The shaft 28 includes a passage 28c alignable with the passage 24g of the spool 24 for passage of the roll pin 24f Distal of a shoulder 28d the shaft 28 has a reduced diameter and smoother finish for cooperating with a shaft receiver 30a of the ratchet 30. One or more pockets 28e are located on the shaft 28 to intermittently receive one or more balls 30b located in one or more ball galleries 30c located on the shaft receiver 30 of the ratchet 30.

The ball galleries 30c are configured to enable the device 10 to provide random change of pull strength, as described more fully below. The ball galleries 30c are desirably ramped on one side so as to only act in one direction. Thus, the ball gallery 30c may or may not align with the pocket 28e of the shaft 28 depending on the relative location of the shaft 28 and ratchet wheel 30d. This feature provides a desirable randomness to the engagement of the ball 30b with the pocket 28e.

Figure 9A:
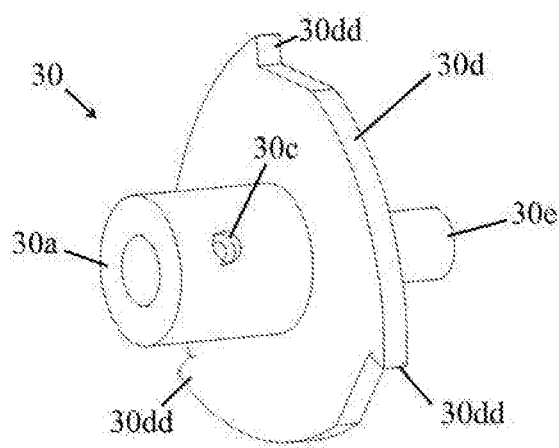
FIGS. 9A and 9B show a ratchet wheel subassembly of the device.
Figure 9B:
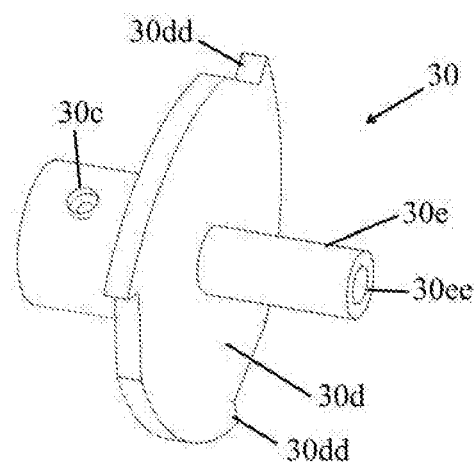

With additional reference to FIGS. 9A and 9B, the ratchet 30 further includes a ratchet wheel 30d connected to the shaft receiver 30a. The ratchet wheel 30d includes spaced apart ratchet teeth 30dd. The ratchet 30 further includes a ratchet shaft 30e connected thereto opposite to and longitudinally aligned with the shaft receiver 30a. A free end 30ee of the ratchet shaft 30e is configured for passage of the fastener 40 through the shaft 30e.

Figure 10A:
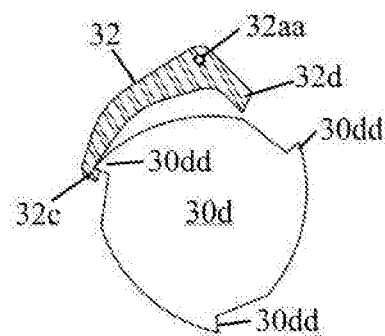
FIGS. 10A and 10B depict operation of a ratchet feature of the device.
Figure 10B:
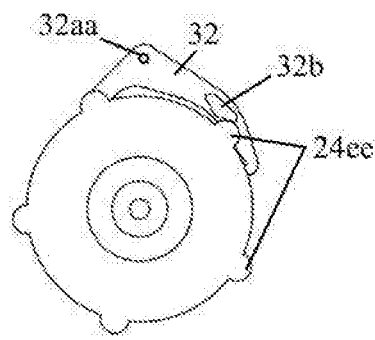
Figure 11:
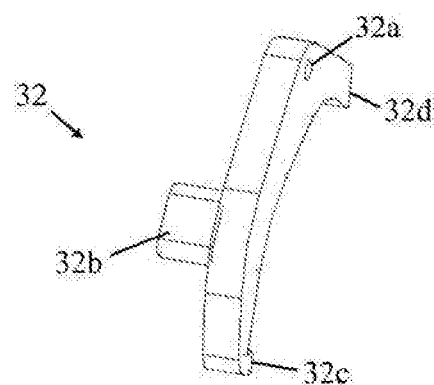
FIG. 11 shows a pawl component of the device.

With additional reference to FIGS. 10A, 10B and 11, the pawl 32 is pivotally mounted to the chassis 20 by a pivot pin 32a that passes through an aperture 32aa of the pawl 32 and a corresponding aperture on the chassis 20. The pawl 32 includes a lift surface 32b configured to interact with the projections 24ee of the ratchet flange 24e of the barrel 24 to pivot and lift the pawl 32 when the lift surface engages the projections 24ee. The pawl 32 also includes engagement surfaces 32c and 32d configured to interact with the teeth 30dd of the ratchet wheel 30d of the ratchet 30 to restrict counterclockwise rotation of the spool 24, as explained more fully below.

The constant tension spring 34 is wound onto a cylindrical body 38b of the rotatable knob 38 with the inner end connected to the cylindrical body 38b of the rotatable knob 38 by friction. The outer end of the constant tension spring 34 has an aperture 34a that connects to the pin 20dd of the tension spring mount 20d of the chassis 20.

The one-way clutch 36 is a sprag clutch having a needle-bearing that is seated onto the fastener 40, and onto which the cylindrical body 38b of the rotatable knob 38 is secured as by press-fitting. After a user winds the knob 38 in a clockwise direction, the constant tension spring 34 will tend to rotate the knob 38 counterclockwise. When this happens, the one-way clutch 36 will engage with the ratchet shaft 30e, which rotates the ratchet wheel 30d counterclockwise against the pawl 32. This winding operation stores energy for later use.

The rotatable knob 38 is desirable formed of one-piece molded plastic and includes a bulb 38c exterior of the cylindrical body 38b. The play indicator 38a is provided as indicia or indicium on the bulb 38c. The bulb 38c is graspable by a user to rotate the knob 38 in a clockwise direction to tension the constant tension spring 36. As the knob 38 rotates counterclockwise during use of the device 10, the indicator 38a gives a visual reference of the amount of unwinding of the constant tension spring 36. The knob 38 includes a longitudinal bore 38d through which the fastener 40 extends to install to the shaft 28.

The fastener 40 is provided as an elongate bolt having a head that abuts a shoulder adjacent the proximal end of the bore 38d and threads at its distal end that threadably engage the threaded end 28b of the shaft 28.

Initially, to prepare the device 10 for use, the user may rotate the knob 38 to wind the constant tension spring 34. The constant tension spring 34 as installed has a pre-determined tension based on the spring characteristics. However, the constant tension spring 34 is frictionally connected to the rotatable knob 38 and the tension may be manually increased by manually winding the rotatable knob 38 in the clockwise direction. The rotatable knob 38 is permitted by the one-way clutch 36 to freely rotate in the clockwise direction and will not cause the rotation in the ratchet 30 which supports the knob 38. Thus, for a larger pet, one may want to increase the tension of the constant tension spring 34 by winding the knob 38 clockwise.

After the knob 38 is wound clockwise, the constant tension spring 34 will urge counterclockwise rotation of the knob 38. When this happens, the one-way clutch 36 will engage with the ratchet shaft 30e and rotate the ratchet wheel 30d counterclockwise against the pawl 32. This winding operation stores energy for later use.

In operation of the device 10, the pet P will grasp the toy 14 and pull so as to unwind the cord 18 from the spool 24. This is resisted by the torsion spring 22 and the rotary speed limiter 26. As the spool 24 rotates, the projections 24ee of the ratchet flange 24e of the spool 24 will contact the lift surface 32b of the pawl 32 to lift the pawl 32 and pivot the engagement surfaces 32c and 32d of the pawl 32 out of engagement with the teeth 30dd of the ratchet wheel 30d of the ratchet 30.

Figure 7:
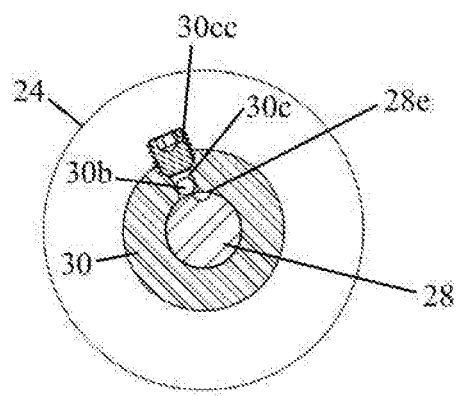
FIG. 7 is a cross-sectional view showing a ball gallery feature of the device.

When this happens, stored energy in the constant tension spring 34 rotates the ratchet wheel 30d counterclockwise. As the ratchet wheel 30d rotates counterclockwise, the ball 30b inside the ball gallery 30c will, when intermittently aligned by the rotation, seat the ball 30b in the pocket 28e to connect the ratchet wheel 30d to the shaft 28 (FIG. 7). When the ball 30b connects the ratchet wheel 30d to the shaft 28, energy from the constant tension spring 34 is transmitted from the ratchet wheel 30d to the shaft 28, through the pin 20dd to the chassis 20, to the spool 24 and finally to the cord 16 connected to the toy 14 to impart additional resistance to the pet P pulling the cord out.

This combination of pawl release and ball engagement will occur at apparently random times during pet engagement with the device 10, resulting in an intermittent increase in resistance which mimics an actual tug-of-war game with a human and the pet. It is believed that this intermittent increase in tug resistance increases interest of the pet during exercise.

When the dog releases the toy 14, force is released on the cord 16 and the cord 16 is rewound on the spool 24 by the torsion spring 22, returning the toy 14 to the original location. The rotary speed limiter 26, which acts in both directions, limits the rate of rewinding so that the cord is not rewound too quickly when the pet releases pressure.

In regard to random increases and decreases of tension experienced by the pet P, it will be appreciated that disconnection of the shaft 28 from the ratchet wheel 30d prevents the ratchet wheel 30d from restricting counterclockwise rotation of the spool 24. Occasionally, the projections 24ee of the ratchet flange 24e will interact with the lift surface 32b of the pawl 32 as the spool 24 rotates. When this happens, counter-clockwise rotation of the ratchet wheel 30d will relieve any energy added to the constant tension spring 34 by the pet P during play.

Accordingly, the present device advantageously provides a self-exercise device that provides resistance to tugging, and is operable to intermittently change the resistance so as to mimic an actual tug-of-war game.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. An exercise device, comprising:
   a frame;
   a rotatable spool mounted on the frame and having a cord windable thereon in a first rotation direction and windable therefrom in a second rotation direction;
   a torsion spring connected to the frame and the spool and configured to urge the spool to rotate in the first rotation direction and to resist rotation of the spool in the second rotation direction;
   a shaft operatively associated with the spool, wherein rotation of the shaft rotates the spool, the shaft including a ball pocket thereon;
   a ratchet having a shaft receiver configured for rotatably receiving the shaft, the shaft receiver including a ball gallery alignable with the ball pocket of the shaft and having a ball located therein, the ratchet further including a ratchet wheel;

a pawl movably connected to the frame and located to selectively engage portions of the spool and portions of the ratchet wheel; and a constant tension spring connected to the frame.

2. The exercise device of claim 1, wherein as the spool rotates in the second direction, portions of the spool contact the pawl to lift the pawl and move the pawl out of engagement with the ratchet wheel, and the constant tension spring rotates the ratchet wheel and intermittently aligns the ball gallery with the ball pocket of the shaft and connects the ratchet wheel to the shaft to enable energy from the constant tension spring to be transmitted to impart additional resistance to rotation of the spool in the second direction.

3. An exercise device, comprising:

a rotatable spool having a cord windable thereon in a first rotation direction and windable therefrom in a second rotation direction, the spool including a ratchet flange having spaced apart projections;

a torsion spring operatively associated with the spool to urge the spool to rotate in the first rotation direction and to resist rotation of the spool in the second rotation direction;

a shaft operatively associated with the spool, wherein rotation of the shaft rotates the spool, the shaft including a ball pocket thereon;

a ratchet having a shaft receiver configured for rotatably receiving the shaft, the shaft receiver including a ball gallery alignable with the ball pocket of the shaft and having a ball located therein, the ratchet further including a ratchet wheel connected to the shaft receiver and having ratchet teeth, and a ratchet shaft connected to the ratchet wheel opposite the shaft receiver;

a pawl having a lift surface configured to engage the projections of the ratchet flange of the spool and one or more engagement surfaces configured to engage the ratchet teeth of the ratchet;

a rotatable knob having a cylindrical body;

an elongate connector extending through the cylindrical body and connecting the rotatable knob to the ratchet shaft of the ratchet;

a one-way clutch seated on the elongate connector in contact with the cylindrical body; and a constant tension spring wound onto the cylindrical body of the rotatable knob.

4. The exercise device of claim 3, further comprising a rotary speed limiter operatively associated with the shaft and the spool to limit rotational speed of the spool in the first rotation direction and the second rotation direction.

5. The exercise device of claim 3, further comprising a pin extending between and connecting the spool to the shaft.

6. The exercise device of claim 3, wherein the torsion spring is positioned within an interior portion of the spool.

7. The exercise device of claim 3, wherein as the spool rotates in the second direction, the projections of the ratchet flange of the spool contact the lift surface of the pawl to lift the pawl and move the one or more engagement surfaces of the pawl out of engagement with the teeth of the ratchet wheel, and the constant tension spring rotates the ratchet wheel and intermittently aligns the ball gallery with the ball pocket of the shaft and connects the ratchet wheel to the shaft to enable energy from the constant tension spring to be transmitted to impart additional resistance to rotation of the spool in the second direction.

8. The exercise device of claim 3, wherein during use of the exercise device the constant tension spring unwinds and the rotatable knob includes an indicator to visually indicate of the amount of unwinding of the constant tension spring.

9. The exercise device of claim 3, further comprising a frame, wherein the torsion spring has opposite ends, with one end of the torsion spring connected to the frame and the other end of the torsion spring connected to the spool, and the pawl is pivotally mounted to the frame.

10. The exercise device of claim 9, wherein the constant tension spring has an end connected to the frame.

11. An exercise device, comprising:

a frame;

a rotatable spool mounted on the frame and having a cord windable thereon in a first rotation direction and windable therefrom in a second rotation direction;

a first spring connected to the frame and the spool and configured to urge the spool to rotate in the first rotation direction and to resist rotation of the spool in the second rotation direction;

a shaft operatively associated with the spool, wherein rotation of the shaft rotates the spool, the shaft including a ball pocket thereon;

a ratchet having a shaft receiver configured for rotatably receiving the shaft, the shaft receiver including a ball gallery alignable with the ball pocket of the shaft and having a ball located therein, the ratchet further including a ratchet wheel;

a pawl movably connected to the frame and located to selectively engage portions of the spool and portions of the ratchet wheel; and a second spring connected to the frame.

12. The exercise device of claim 11, wherein as the spool rotates in the second direction, portions of the spool contact the pawl to lift the pawl and move the pawl out of engagement with the ratchet wheel, and the second spring rotates the ratchet wheel and intermittently aligns the ball gallery with the ball pocket of the shaft and connects the ratchet wheel to the shaft to enable energy from the second spring to be transmitted to impart additional resistance to rotation of the spool in the second direction.

13. The exercise device of claim 11, wherein the first spring comprises a torsion spring.

14. The exercise device of claim 11, wherein the second spring comprises a constant tension spring.

* * * * *

UNITED STATES PATENT AND TRADEMARK OFFICE
CERTIFICATE OF CORRECTION

| | |
|---|---|
| PATENT NO. | : 11,266,121 B2 |
| APPLICATION NO. | : 16/916566 |
| DATED | : March 8, 2022 |
| INVENTOR(S) | : Davante Amir Rowe and Robert Scott Post |

It is certified that error appears in the above-identified patent and that said Letters Patent is hereby corrected as shown below:

In the Drawings

Figure 5A:
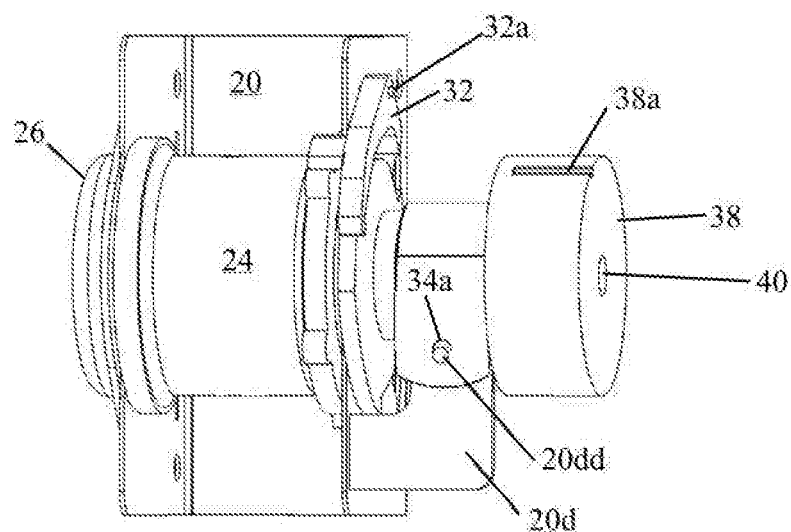
FIG. 5A shows components of the exercise device and FIG. 5B is a cross-sectional view thereof.

FIG. 5A – the lead line for reference number 38 is replaced with an arrow

Figure 5B:
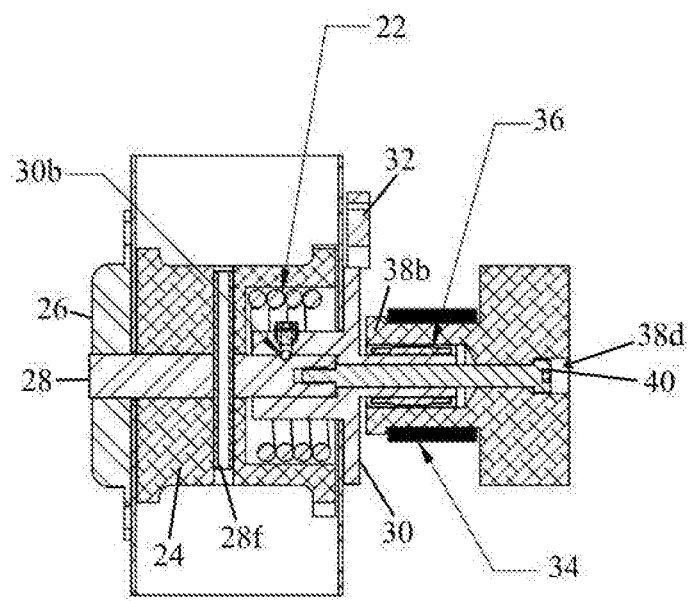
Figure 6A:
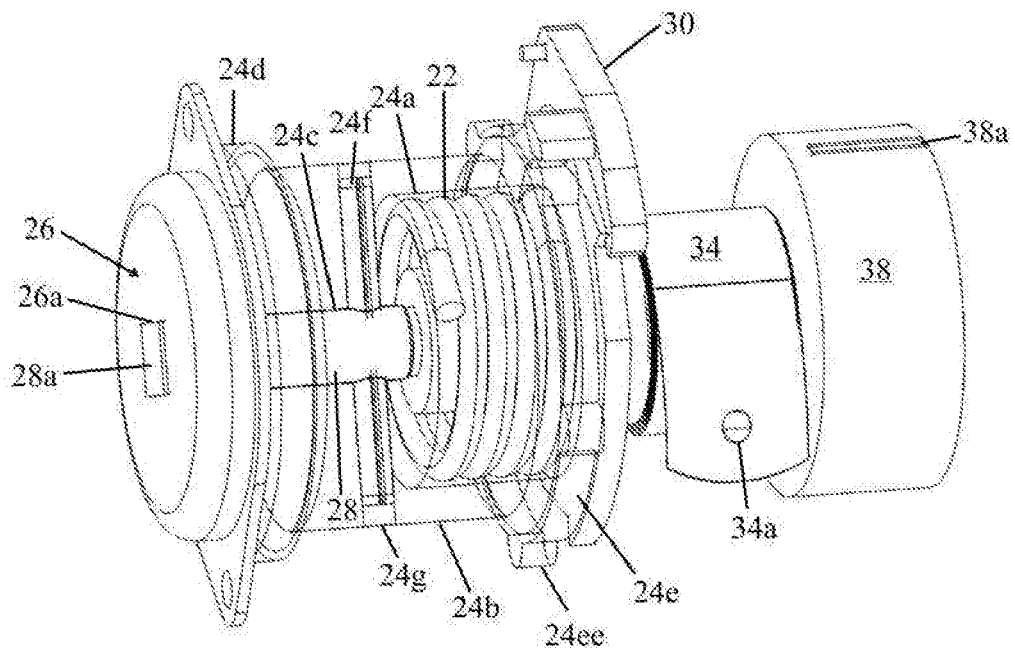
FIG. 6A is a detailed view of the exercise device with some components transparent to show interconnection of the components.
Figure 6B:
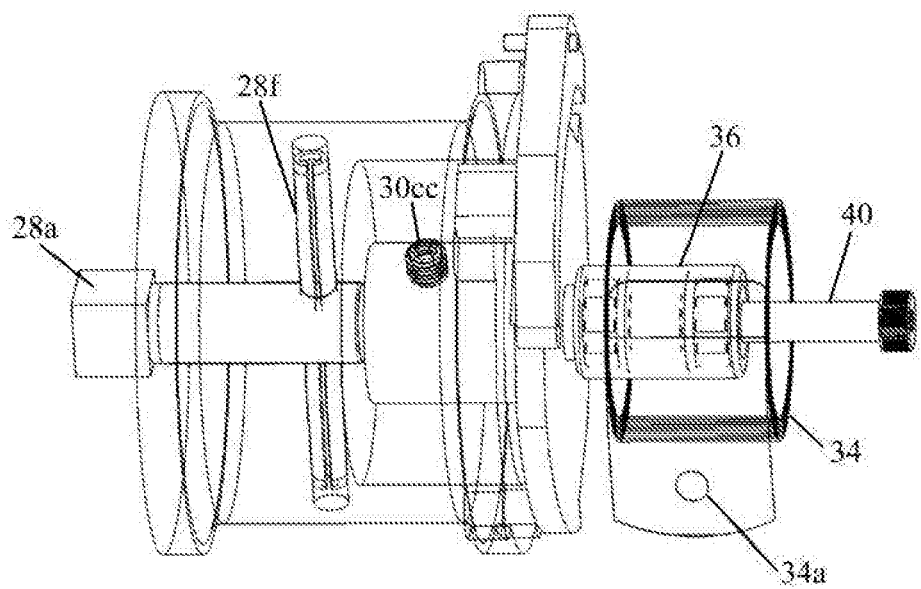
FIG. 6B is the same but with a speed limiter component removed from the left end, a torsion spring removed from within the spool, and a winding knob removed from the right end.
Figure 6C:
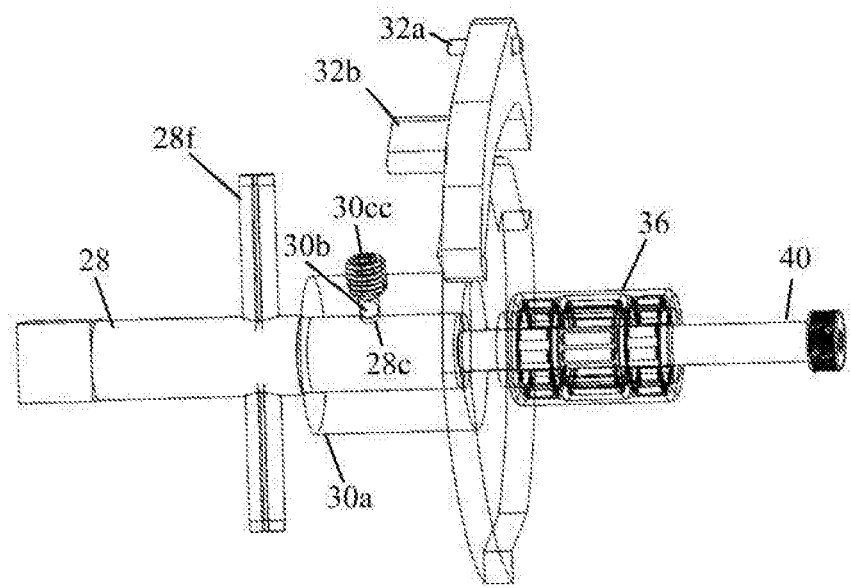
FIG. 6C is the same, but with a spool component removed on the left side and a constant tension spring component removed from the right side.

FIG. 5B – Reference number 28f is replaced with 24f; Reference number 38c and its lead line are added FIG. 6B – Reference number 28f is replaced with 24f FIG. 6C – Reference number 28f is replaced with 24f; Reference number 28c is replaced with 28e In the Specification "barrel 24" [Column 4, Line 8] should be "spool 24"

Signed and Sealed this
Twenty-second Day of November, 2022

Katherine Kelly Vidal
*Director of the United States Patent and Trademark Office*